United States Patent [19]
Pfefferle

[11] Patent Number: 5,893,039
[45] Date of Patent: Apr. 6, 1999

[54] CATALYTIC METHOD

[75] Inventor: William C. Pfefferle, Madison, Conn.

[73] Assignee: Precision Combustion, Inc., New Haven, Conn.

[21] Appl. No.: 843,258

[22] Filed: Apr. 14, 1997

[51] Int. Cl.$^6$ .............................. F02M 57/00; F02D 43/00
[52] U.S. Cl. ...................... 701/103; 123/673; 123/676; 123/480; 60/274; 60/285; 701/108; 701/109
[58] Field of Search ................................... 701/101, 103, 701/102, 109, 108; 60/274, 276, 277, 285, 289; 123/674, 675, 676, 672, 673, 480, 481

[56] References Cited

U.S. PATENT DOCUMENTS

| | | | |
|---|---|---|---|
| 4,201,161 | 5/1980 | Sasayama et al. | 123/675 |
| 4,274,373 | 6/1981 | Sugasawa et al. | 60/276 |
| 5,131,224 | 7/1992 | Siewert et al. | 60/274 |
| 5,452,576 | 9/1995 | Hamburg et al. | 60/274 |

*Primary Examiner*—Willis R. Wolfe
*Assistant Examiner*—Hieu T. Vo
*Attorney, Agent, or Firm*—Kane, Dalsimer, Sullivan, Kurucz, Levy, Eisele and Richard

[57] ABSTRACT

A catalytic reaction system for promoting hydrocarbon reduction during periods of fuel rich engine operation of a multicylinder internal combustion engine which operates from signals generated by a microprocessor based engine controller. Each cylinder is fueled by an injection means, signalled by the engine controller. The amount of fuel injected into each cylinder may be different, so that each cylinder can be operated at different fuel/air ratios. The microprocessor senses metered air intake, ambient temperatures, engine speed and exhaust gas oxygen content. The sensed information is used to calculate the amount of oxygen needed by the catalytic converter to efficiently remove hydrocarbons and by adjusting the fuel/air ratios in one or more cylinders, effects the quantity of oxygen fed to the exhaust gas.

21 Claims, 2 Drawing Sheets

CATALYTIC METHOD

BACKGROUND OF THE INVENTION

1. Field of the Invention

This invention relates to improved systems and methods for controlling emissions from internal combustion engines. In one specific aspect, the present invention relates to improving catalyst converter light-off performance following engine cold start. In another specific aspect, the present invention relates to efficient and effective control of emissions at highway speeds.

2. Brief Description of the Prior Art

Automotive emissions are still a major environmental problem despite major advances in emissions control resulting from the use of catalytic converters. First and most important, pollution is not controlled during the initial sixty to ninety or more seconds of operation after cold starting (weather dependent) required to heat the converter catalyst to an effective operating temperature. In addition, emissions are not controlled at typical high load highway speeds (above the range covered by the Federal Test Procedure (FTP)) at which engines must also run sufficiently fuel rich that effective and efficient operation of the catalytic converter is impaired by the lack of sufficient oxygen. As is well established in the art, an engine must operate within about one percent of the stoichiometric fuel/air ratio if all three exhaust pollutants, hydrocarbons, carbon monoxide, and nitrogen oxide are to be efficiently reacted by the catalytic converter. This typically requires closed loop control using an exhaust gas lambda sensor. Even with as little as one to three percent excess fuel, hydrocarbon emissions can be excessive. $NO_X$ control is impaired with less than one percent excess air.

To meet the emission levels required by new regulations such as the California ULEV standards, it is critical that effective and efficient operation of the catalyst be achieved in less than about twenty or thirty seconds after engine starting, especially with larger engines. However, in present converters heating of the catalyst to an effective temperature by hot engine exhaust gases typically takes more than sixty seconds, even with close coupling of the catalyst to the engine. Provided sufficient oxygen is present in the exhaust, the required fast light-off can be achieved by using electrically preheated catalysts, close coupled catalysts with much higher precious metal loadings to reduce light-off temperature or most advantageously the fast light-off catalysts of my U.S. Pat. No. 5,417,933 which have demonstrated fast light-off even without close coupling to the engine. Typically however, during the first thirty or so seconds of operation, the engine operates rich (ie with insufficient air to consume all the fuel, typically with lambda values much lower than 0.95 or even 0.85) resulting in exhaust gas with insufficient oxygen for adequate catalytic conversion of hydrocarbons and carbon monoxide. To achieve efficient conversion of all three pollutants, stoichiometry must be very close to a lambda value of one, with a lambda even as high as about 1.01 (1% excess air) $NO_X$ conversion is minimal and with a lambda of 0.98 (excess fuel) hydrocarbon and carbon monoxide conversion are seriously impaired. Thus, even with the various means which have been developed for rapid catalyst light-off, only partial conversion of hydrocarbons is possible without the presence of sufficient oxygen in the exhaust gases, ie. exhaust gas lambda must be higher than about 0.98.

Efficient means to supply "sufficient" oxygen (hereinafter air) in the exhaust stream has not been developed. For any catalyst to operate at its required conversion level sufficient air must be available. "Sufficient air" is air quantities sufficient to allow achievement of required conversion levels. "Suitable air" is sufficient air that limits cooling of the exhaust gases. Current technology typically provides sufficient air by means of an air pump to add the air needed for conversion to the exhaust gas. Addition of air to the exhaust is difficult to regulate and requires additional engine hardware. Moreover, the air is at ambient temperature and thus tends to cool the exhaust stream to the catalyst, in addition there is often either too little air added to support adequate conversion or too much such that $NO_X$ conversion is impaired.

To avoid the need for air addition, there have been efforts to limit the initial period of low lambda engine operation to less than thirty seconds. Although there has been some success in reducing the duration of low lambda operation for mild ambient air temperatures, engines must start even at winter temperatures and still achieve low emissions. In addition, emissions must also be controlled at highway speeds where very low lambda operation is often needed for engine cooling.

The present invention meets the need to control internal combustion engine emissions during periods of rich operation by providing a method of engine operation which utilizes the engine itself to provide oxygen for catalyst operation during such rich burn operation by balancing rich burn cylinder firings with compensating lean burn firings. The invention offers the advantage over the prior art of allowing for addition of more suitable air to the exhaust, air at a temperature greater than ambient and with greater regulation. Thus, the present invention allows much more rapid light-off of fast light-off or close coupled converter catalysts after engine starting, and also allows for emissions control at high speed/high power conditions for which low lambda operation provides required engine cooling. The latter aspect of this invention is especially important in view of the new USO6 standards which require emissions control at speeds above those for the present FTP test. In the method of the present invention as applied to engine cooling, not only is an engine exhaust composition provided which allows suitable emissions control but all cylinder firings impose less thermal loading than if operated at stoichiometric ratios.

SUMMARY OF THE INVENTION

It has now been found that during low lambda operation of multi-cylinder internal combustion engines, such as during cold starting, sufficient air for catalytic conversion of hydrocarbons can be supplied by programming periodic lean or fuel free cycles, without seriously affecting engine operability. With both fuel and air flow monitored by the engine controller, the total fuel flow is controlled such that although the majority of firing cycles may be operated full fuel rich (lambda less than about 0.95), the overall fuel-air ratio is closer to stoichiometric or even slightly on the lean side, thus assuring sufficient air in the exhaust gases for conversion of pollutants. Inasmuch as $NO_X$ production is usually insignificant during the first few seconds after cold starting, it is often desirable to have some excess air during this initial period. Therefore the present invention provides an advantageous method for control of exhaust emissions during full rich burn engine operation.

BRIEF DESCRIPTION OF THE DRAWINGS

The FIG. 1 depicts schematically an internal combustion engine with a fuel injection controller for use in the present invention.

DETAILED DESCRIPTION OF THE INVENTION AND PREFERRED EMBODIMENTS

Figure 1:
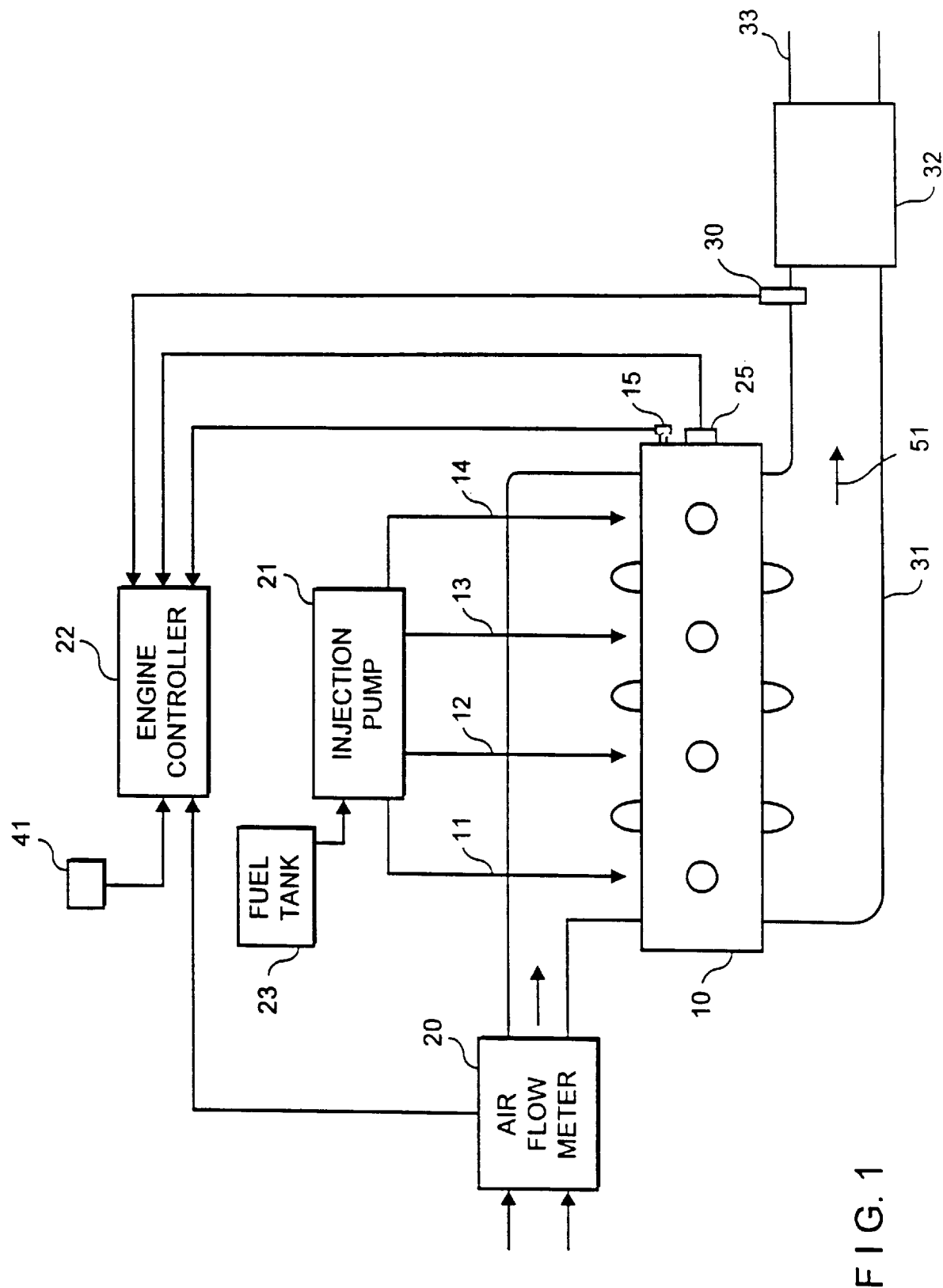
Figure 2:
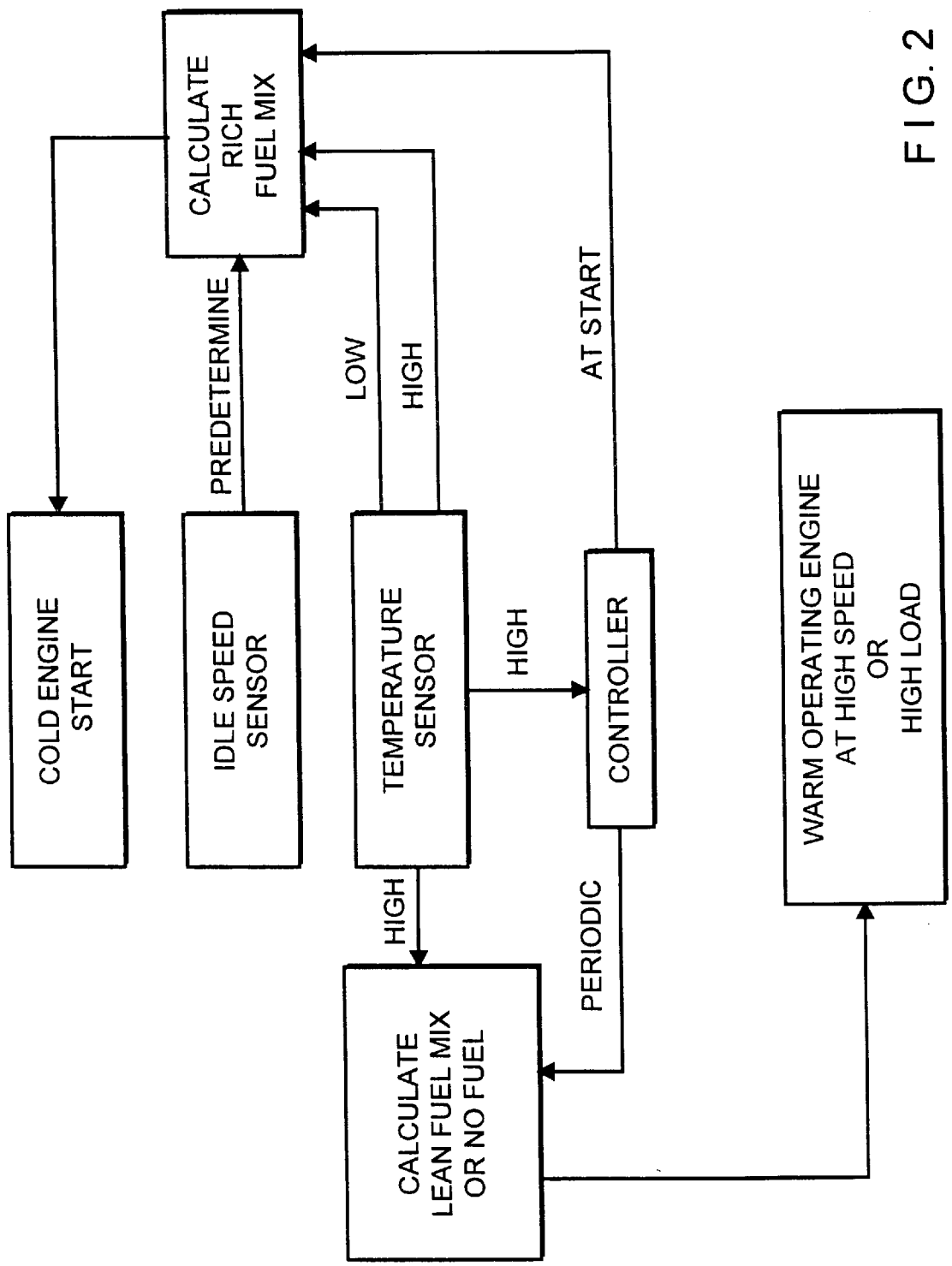
FIG. 2 is a flow chart illustrating the process of the invention.

With a sufficiently fast light-off catalyst, such as the catalysts of U.S. Pat. No. 5,417,933, using the method of the present invention allows provision of sufficient, suitable air in the exhaust gases from the engine to achieve thirty to fifty percent or more conversion of hydrocarbons in as little as twenty seconds or even ten seconds or less after engine starting thus eliminating the need for separate addition of air to the exhaust from the engine. Sixty to ninety percent or more conversion is achievable within about thirty seconds.

As is presently conventional practice, the engine is started with all cylinders operating on the rich side of stoichiometric typically with a lambda of less than 0.90. For the first few revolutions of the engine all cylinders are operated on the rich side of stoichiometry such as to give the most stable operation. In the method of the present invention, once the engine achieves basic stability as indicated for example by a predetermined idle speed or the achievement of a predetermined block temperature, typically within about two to five seconds, the stoichiometry of selected cylinder power strokes is shifted towards the lean side of stoichiometric with the rich burn firings preferably operated at a lambda value of 0.85 or less to assure presence of hydrogen in the exhaust gases. The presence of hyrogen enables catalyst light-off at a lower temperature than otherwise.

Typically, no more than one cylinder per bank is fueled lean during a given revolution of the engine particularly if the engine bank has four or fewer cylinders as in a V6 or V8 engine. Basic stability is typically indicated by achievement of a critical speed sufficient to allow some alteration in the stoichiometry of selected cylinder power strokes (engine dependent).

To maximize exhaust gas temperature during cold engine starting and thus promote faster catalyst light-off, it is often advantageous to initially operate the lean burn firings closer to stoichiometric than the value needed to supply all the oxygen required for complete conversion of pollutants. During the cold start sequence, stoichiometry of the rich burn firing cycles may gradually shift from the initial rich value to a final value closer to stoichiometric where conventional closed loop lambda control takes over as is the normal practice. Thus, during cold starting the amount of excess air needed from lean cylinder firings is correspondingly reduced. However, it may be desirable to maintain the rich burn firings at a high full rich stoichiometry for about ten to fifteen or twenty seconds to provide a more catalytically reactive exhaust composition, i.e. containing a significant concentration of hydrogen. This approach is particularly useful in winter weather conditions. Optimization of the required fuel injection control is engine dependent and readily achievable by those skilled in engine control systems.

For control of emissions when low lambda operation is required for engine cooling, lean burn power strokes permit supplying sufficient oxygen to the exhaust gases for continued control of hydrocarbons without impairment of $NO_x$ control especially if a universal oxygen sensor is used as the lambda sensor. However, for maximum cooling it is often desirable to substitute random or rotating unfueled "power strokes" which may require the use of a catalytic converter with more oxygen storage capacity than would otherwise be required.

Preferably, both individual cylinder and overall stoichiometry are monitored. Although it is especially advantageous to utilize direct in-cylinder injection of fuel to obtain superior control of individual cylinder stoichiometry on each firing cycle in transient operation of the engine, conventional fuel injection techniques may be used.

In the accompanying figures, each cylinder of spark ignition engine 10 are fueled by individual fuel supply lines 11, 12, 13, and 14 such that fueling for each cylinder by fuel injection pump 21 from supply tank 23 is independently controllable by microprocessor based engine controller 22 capable of operating different cylinders at different fuel/air ratios. Such controllers are used on automotive engines for both open and-closed loop control of engine fueling and in addition have been used to achieve traction control by limiting engine output or to minimize vibration and function by controlling the number of fueled cylinders; see for example U.S. Pat. Nos. 4,172,434; 4,489,695; 4,951,773 and 5,287,279. Controller 22, for example, can be based on a microprocessor such a Compuadd Model 320 with an Intel 80386 processor operating at 20 MHZ.

Controller 22 is coupled to receive information from ambient air temperature sensor 41, camshaft position/engine speed sensor 25, engine block temperature sensor 15, air flow meter 20 and lambda sensor 30, preferably a universal oxygen sensor, in insulated engine exhaust pipe 31. Treated exhaust exits through pipe 33. In accordance with the art, controller 22 is programmed in the conventional manner to control the injection timing using input from position sensor 25 and the air-fuel ratio by control of the amount of fuel injected from injection pump 21 based on the air flow as measured by meter 20 and in normal closed loop control as corrected based on the signal from lambda sensor 30 to maintain lambda between about 0.99 and 1.005. For this invention, however, controller 22 is given an additional operating function. When the engine must operate in a low lambda mode as signaled by block temperature sensor 15 that the block temperature is below a predetermined temperature or above a predetermined safe value, then in addition to evaluating the fuel/air ratio at which the engine is operating using the known values of air flow from sensor 20 as corrected for the air temperature as measured by sensor 41 and the now increased fuel being injected, controller 22 relates this ratio to the oxygen needs of the catalytic converter 32 containing an oxidation catalyst, typically a three way catalyst. Controller 22 then calculates the oxygen deficiency in the exhaust gas 51 during low lambda operation as for example based on a running average of the fuel/air ratio of the full rich firing cycles, such as over the previous three to twenty-five firing cycles, a deficiency in oxygen that limits performance of the catalytic converter 32. Controller 22 will then calculate a make-up air requirement. Controller 22 typically its using stored engine performance data will then calculate an optimum fueling sequence to maximize engine performance whereby selected cylinder power strokes are operated lean or unfueled to provide the necessary air for converter operation. Then, as appropriate, controller 22 directs injection pump 21 to inject a less than stoichiometric amount of fuel (as little as zero) for each selected cylinder power stroke. It is envisioned that the added functioning of Controller 22 would operate during the two dominate operational modes where the engine is running in a low lambda regime- cold engine starting and high load engine operation.

Cold Start Operation

In the cold starting operational mode the invention would operate as follows. On cold starting, the engine would initially operate rich in the conventional manner. For engine starting, controller 22 is programmed to bring the engine to a predetermined idle speed with cylinder combustion stoichiometries as appropriate for the prevailing ambient and engine block temperatures. It should be understood that a warmed up engine or a high ambient temperature requires less fuel enrichment of the combustion air than is needed for very cold starts. At this pre-determined idle speed if the engine is not running at or near stoichiometric, controller 22 would calculate a make-up air requirement based on the known requirements of the catalytic converter 32. Controller 22 would then determine for each cylinder power stroke a specific fuel/air mixture ratio, which for the selected lean cylinder power strokes could be as low a zero, so that air would added to the exhaust gas 51 from the selected power stroke. Controller 22 would then direct injection pump 21 to provide the appropriate amount of fuel or no fuel. When the engine reaches a predetermined temperature, as indicated by temperature sensor 15, at which rich burning cylinders will sustain near stoichiometric operation, conventional stoichiometric operation may be established.

High Speed/High Load Rich-Burn

For high load, high speed operation, needed engine temperature control is achieved without sacrificing emissions control by again operating with combinations of full rich and lean burn or fuel free firing cycles. For such operation, the Controller 22 is programmed to operate with full rich combustion during predetermined engine operating loads or on receipt of a signal from temperature sensor 41 that the engine is running above a pre-determined temperature. Accordingly, upon receiving a signal from block temperature sensor 41 indicating an over temperature condition, controller 22 operates to provide a combination of low lambda (fuel rich) and fuel free cylinder firings to achieve overall near stoichiometric fuel/air ratios along sufficiently rich individual cylinder firings to minimize engine overheating in conjunction with the balancing fuel free firings. Upon reduction of engine temperature to a predetermined temperature, the output signal ceases and all cylinders revert to conventional stoichiometric closed loop control.

What is claimed is:

1. A catalytic reaction system for promoting hydrocarbon conversion reactions during low lambda operation of a multicylinder internal combustion engine, said reaction system comprising:
   a) an internal combustion engine, said engine comprising;
      (i) at least two cylinders,
      (ii) an air intake, said air intake in communication with said cylinders;
      (iii) individual cylinder fuel injection into said cylinders, said injection having means to independently inject specific amounts of fuel into each cylinder based on the air intake thereby fixing a fuel/air ratio in each said cylinder;
   b) a catalytic converter;
   c) a duct, said duct connecting said cylinders to said catalytic converter;
   d) controller means coupled to receive information from;
      (i) an ambient air temperature sensor;
      (ii) a camshaft position/engine speed sensor, said speed sensor located on said engine;
      (iii) an air flow meter, said air flow meter mounted within said air intake; and
      (iv) a block temperature sensor, said temperature sensor mounted in said engine;

said controller means having means for determining low lambda operation, said controller means having means to calculate during said low lambda operation an oxygen deficiency in an exhaust gas relative to the needs of the catalytic converter and to control the means to independently inject specific amounts of fuel into each cylinder to operate a number of cylinder firings at a lean or fuel free stoichiometry whereby sufficient oxygen is supplied to the exhaust gases to permit the catalytic converter to convert at least fifty percent of the hydrocarbons present in said exhaust gases.

2. The system of claim 1 which includes a lambda sensor in the exhaust duct as a means to monitor and allow adjustment of the mean exhaust gas fuel/air for optimal converter performance said lambda sensor providing input to said controller.

3. The system of claim 1 comprising a catalytic converter capable of storing sufficient oxygen to convert at least about fifty percent of the hydrocarbons from at least two or more full fuel-rich consecutive cylinder firings.

4. The system of claim 1 including speed sensor means connected to said controller means to allow delay of said lean firings starting until the engine reaches a predetermined speed.

5. The system of claim 4 wherein the time to the first lean burn firing is within about ten seconds of engine starting.

6. The system of claim 5 wherein said converter comprises a fast light-off oxidation catalyst.

7. The system of claim 1 wherein said converter comprises a three way catalyst.

8. The method of increasing the air content in oxygen deficient exhaust gases from internal combustion engines comprising:
   a) operating multiple cylinders at a low lambda fuel/air ratio;
   b) periodically operating at least one firing cycle for every ten low lambda cycles at a fuel/air ratio less than stoichiometric;
whereby air is added to the exhaust of the engine for conversion of pollutants from low lambda cycles.

9. The method of claim 8 wherein said low lambda operation is controlled to augment engine cooling.

10. The method of claim 8 wherein said fuel/air ratio is zero.

11. The method of claim 8 comprising the step of passing exhaust into contact with an oxidation catalyst.

12. The method of claim 11 wherein said catalyst comprises a three way catalyst.

13. The method of claim 11 wherein said catalyst is close coupled to the engine.

14. The method of claim 8 wherein said exhaust is passed into contact with a catalyst through an insulated exhaust duct.

15. The method of controlling combustion exhaust emissions from internal combustion engines during initial engine operation comprising the steps of:
   a) providing a fuel rich mixture of fuel and air during initial engine operation,
   b) periodically operating at least one in ten firing cycles fuel lean with a lambda greater than about 1.02 upon achievement of stable engine operation, whereby oxygen is provided for conversion of pollutants.

16. The method of claim 15 comprising the step of passing engine exhaust gases into contact with an oxidation catalyst.

17. The method of claim 16 wherein sufficient and suitable air is supplied such that said catalyst reaches an effective operating temperature within approximately twenty seconds of start of engine cranking.

18. The method of claim 16 comprising the step of passing engine exhaust through an insulated conduit into contact with said catalyst.

19. The method of claim 15 wherein said stable operation is determined by achievement of a predetermined engine speed.

20. The method of claim 15 wherein said stable operation is determined by achievement of a predetermined block temperature.

21. The method of claim 15 wherein said fuel lean cycles are fuel free.

* * * * *